United States Patent [19]
Harbaugh

[11] Patent Number: 5,878,572
[45] Date of Patent: Mar. 9, 1999

[54] PROPORTIONING DEVICE FOR A BRAKE SYSTEM

[75] Inventor: Richard Lee Harbaugh, South Bend, Ind.

[73] Assignee: Robert Bosch Technology Corporation, Broadview, Ill.

[21] Appl. No.: 916,643

[22] Filed: Aug. 22, 1997

[51] Int. Cl.$^6$ .............................. F15B 7/00; B60T 11/06
[52] U.S. Cl. ............................................. 60/535; 60/561
[58] Field of Search .............................. 60/535, 561, 582

[56] References Cited

U.S. PATENT DOCUMENTS

| | | | |
|---|---|---|---|
| 2,782,600 | 2/1957 | Crown et al. | 60/582 X |
| 2,921,440 | 1/1960 | Feibush | 60/582 |
| 3,434,286 | 3/1969 | Raizes | 60/535 |
| 3,605,410 | 9/1971 | Herriott | 60/535 |
| 3,886,746 | 6/1975 | Farr | 60/561 X |
| 4,024,712 | 5/1977 | Takeuchi | 60/535 |
| 4,072,011 | 2/1978 | Ewald | 60/561 X |
| 4,335,736 | 6/1982 | Maehara et al. | 60/562 X |
| 4,753,487 | 6/1988 | Bach | 60/535 X |
| 4,754,605 | 7/1988 | Seibert et al. | 60/582 X |
| 4,908,522 | 3/1990 | Crumb et al. | |

*Primary Examiner*—John E. Ryznic
*Attorney, Agent, or Firm*—Leo H. McCormick, Jr.; Warren Comstock

[57] ABSTRACT

A brake system (10) having a proportioning device (18) through which a first fluid pressure is communicated to a first brake circuit and a second fluid pressure is communicated to a second brake circuit. The proportioning device (18) has a housing (90) with a first bore (204) connected with a first passage (98) for receiving the first fluid pressure and with a second passage (100) for receiving the second fluid pressure. A first piston (210) located in the first bore (204) of the housing (90) separates the first passage (98) from the second passage (100). The first piston (210) responds to a higher fluid pressure of the first and second fluid pressures by moving in the first bore (204) to providing additional fluid pressure to a lower fluid pressure of the first and second fluid pressures to substantially equalize the first and second fluid pressures supplied to the first and second brakes circuits for effecting said brake application. A second piston (110) located in a second bore (104) of the housing (90) separates the first passage (98) from the second passage (100). The second piston (110) responds to a pressure differential between the first and second fluid pressures to interrupt communication to the first or second brake circuit correspondingly connected to the lower fluid pressure while opening communication (124,126) with a reservoir (96) for the lower fluid pressure to prevent loss of fluid from the brake system.

8 Claims, 2 Drawing Sheets

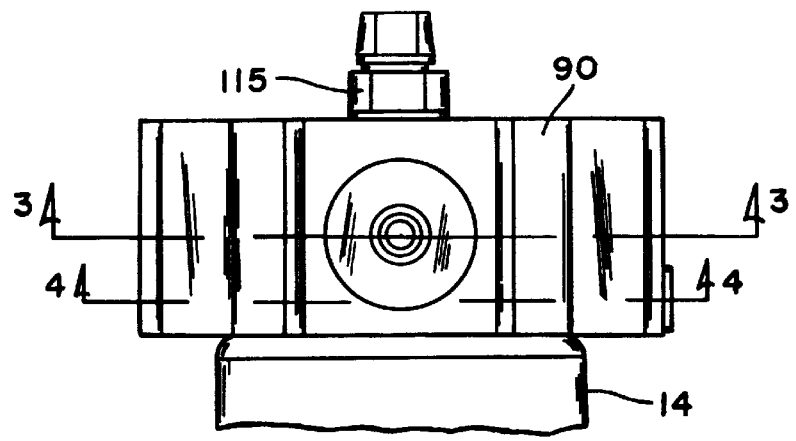
FIG. 2
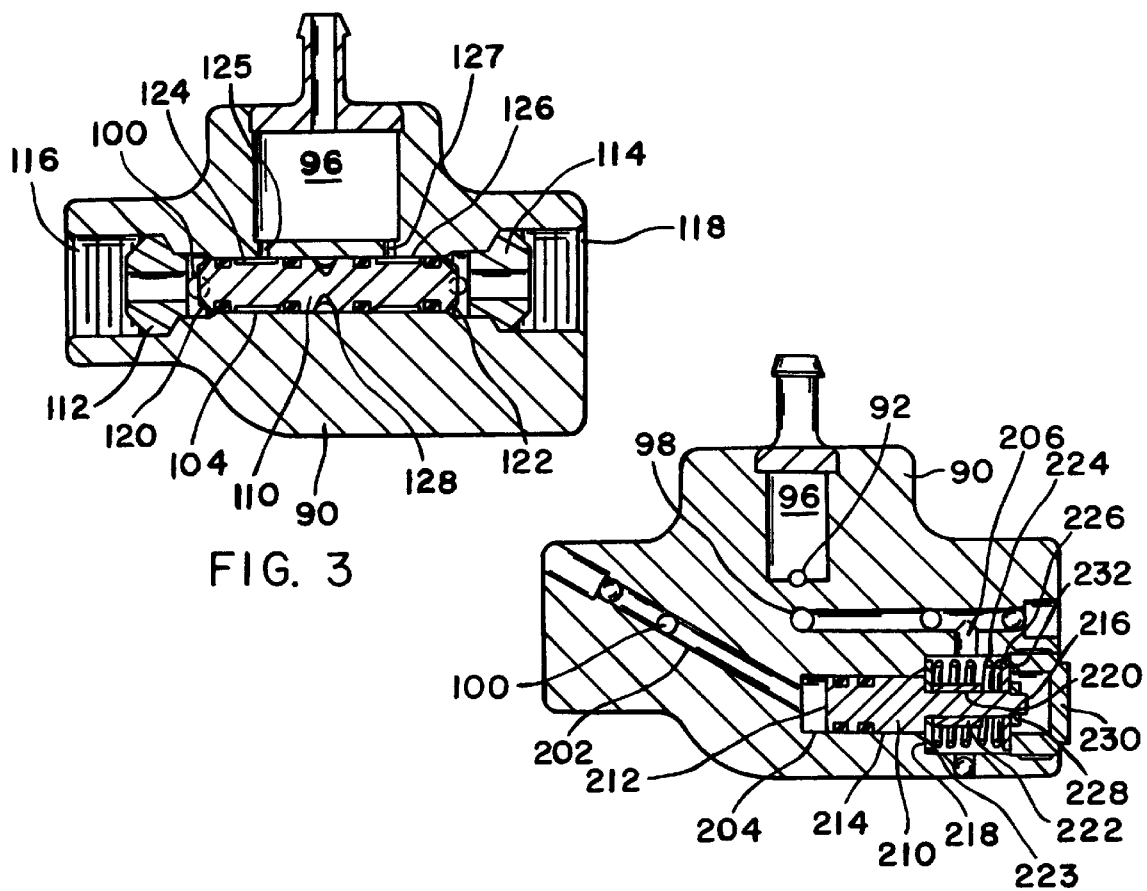
FIG. 3
FIG. 4

PROPORTIONING DEVICE FOR A BRAKE SYSTEM

This invention relates to a proportioning device for use in a brake system to provide an additional amount of fluid to balance the fluid pressure supplied to first and second brake circuits during a brake application should a pressure differential exist between the fluid pressure presented to the first and second brake circuits.

BACKGROUND OF THE INVENTION

U.S. Pat. No. 5,233,911 discloses a typical tandem brake booster through which a force is developed to effect a brake application. In such a brake booster, the interior is divided into first and second front chambers and first and second rear chambers by corresponding first and second walls. The first front chamber is externally connected to a first source of fluid pressure by a conduit and internally directly connected to the second front chamber and to the first and second rear chambers by various passages in a hub associated with the first and second walls. A control valve located in the hub is positioned such that the first fluid pressure is communicated in the first and second rear chambers to define a rest or ready position. In responsive to an input force, the control valve is positioned such that a second fluid pressure is presented to the first and second rear chambers to create a pressure differential across the first and second walls. This pressure differential acts on the first and second walls to develop an output force which is provided to a master cylinder to assist in effecting a brake application. On termination of the input force, a spring returns the control valve to a rest or ready position of the first mode of operation as the second fluid is evacuated from the first and second rear chambers to allow the first fluid pressure to again be present in the first and second rear chambers. This type vacuum brake booster functions in an adequate manner to provide an assist in effecting a brake application.

U.S. Pat. Nos. 4,409,885, 4,942,738 and 5,329,769 disclose brake boosters and master cylinder arrangements wherein at least a portion of the master cylinder housing is positioned within the interior of the booster housing to define an integrated brake assembly. Such brake boosters operate in a satisfactory manner but because of their overall size they still occupy considerable under the hood space when installation in a vehicle.

In a typical brake system, fluid pressure is supplied to separate brake circuits after passing through a proportioning valve to assure that the fluid pressure supplied to corresponding brakes i.e. right and left front brakes and right and left rear brakes, is identical such as disclosed in U.S. Pat. Nos. 4,753,487 and 4,908,522. In such brake systems if a brake circuit should become inoperative or develop a leak, it is possible that different fluid pressures will actually be presented to the individual brakes during a brake application. This situation is undesirable since it is possible to create a skid condition under certain conditions.

SUMMARY OF THE INVENTION

A primary object of the present invention is to provide a brake system with a proportioning device to assure that identical fluid pressure is supplied to first and second brake circuits should a minimal difference occurs between fluid pressure supplied to first and second brake systems and to terminate of fluid pressure supplied to a brake circuit having a lower fluid pressure if a predetermined pressure differential occurs between the fluid pressure supplied the first and second brake circuits.

According to this invention, a brake system is equip with a proportioning valve having a housing with a first bore connected by a first passage for receiving a first fluid pressure and a second passage for receiving the second fluid pressure from a master cylinder. A first piston is located in the first bore of the housing and a second piston is located in a second bore for separating the first passage from the second passage. The first fluid pressure is supplied to the first brake circuit and the second fluid pressure is supplied to the second brake circuit. Should a pressure difference occur between the first and second fluid pressures, the first piston responds to a higher fluid pressure of the first and second fluid pressures by moving in the first bore to providing an additional fluid pressure to a lower fluid pressure of the first and second fluid pressures to substantially equalize the first and second fluid pressures supplied to the first and second brakes for effecting a brake application. Should the difference in fluid pressures reach a predetermined level, the second piston responds to such pressure differential by moving to interrupt communication to the brake circuit connected to the lower fluid pressure while opening communication with a reservoir for the lower fluid pressure to prevent loss of fluid from the brake system.

An advantage of this brake system is provided by a proportioning device which assists in providing additional fluid pressure to balance the fluid pressure supplied to first and second brake circuits and to terminate communication to a brake circuit experiencing a lower fluid pressure should a pressure differential remain after an attempt to balance the fluid pressures.

A still further advantage of this invention is provided through the conservation of fluid in a brake circuit by diverting fluid from a brake circuit experiencing a low fluid pressure condition.

BRIEF DESCRIPTION OF THE DRAWINGS

FIG. 2 is a view taken along line 2—2 of FIG. 1;

FIG. 3 is a sectional view taken along line 3—3 of FIG. 2; and

FIG. 4 is a sectional view taken along line 4—4 of FIG. 2.

DETAILED DESCRIPTION

Figure 1:
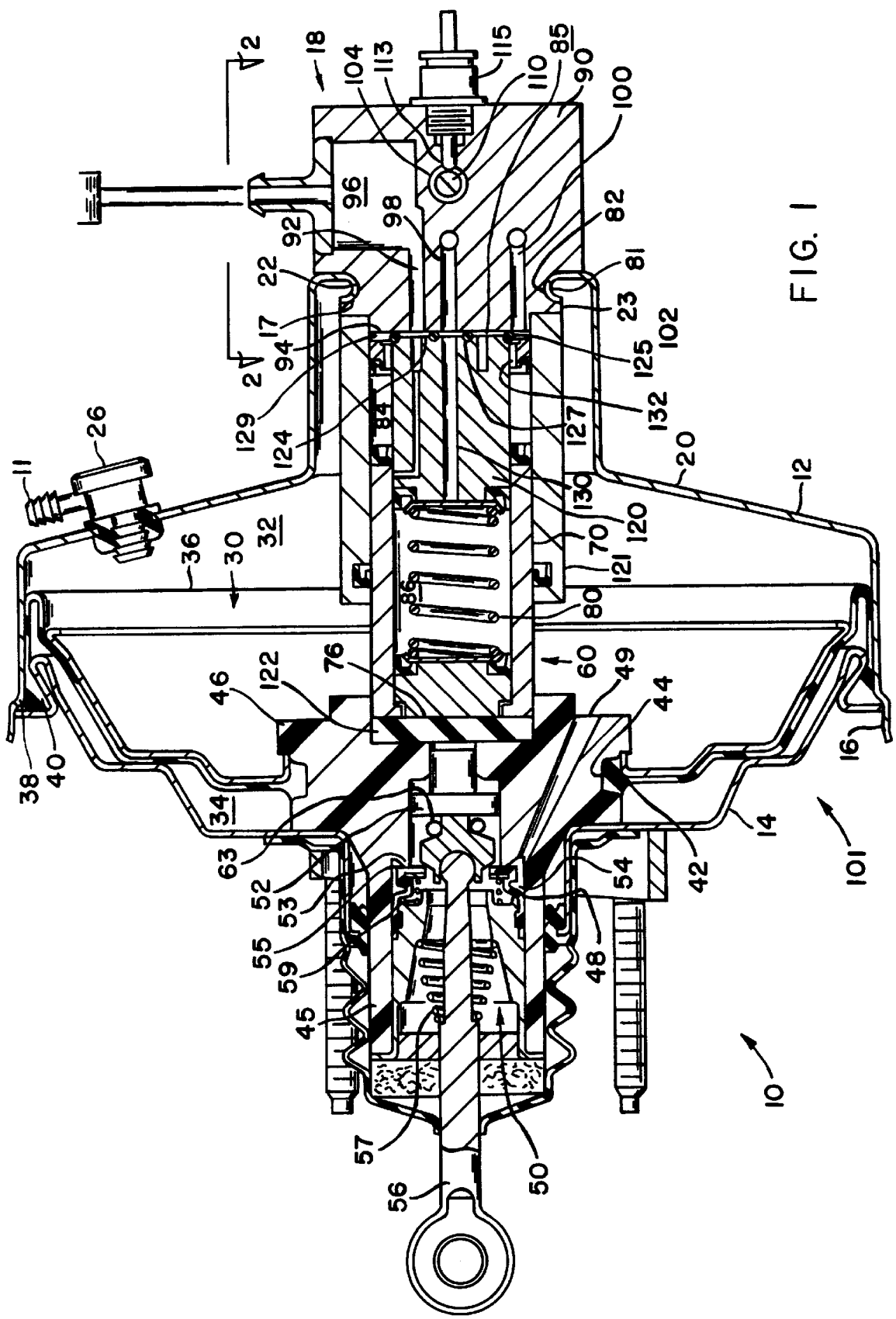
FIG. 1 is a sectional view of an integrated brake booster and master cylinder with concentric first and second pressurizing chambers having a proportioning device made according to the principals of the invention through which first and second fluid pressures are supplied to first and second brake circuits.

The brake assembly 10 illustrated in FIG. 1 and is fully disclosed in U.S. patent application Ser. No. 08/879,383. The brake assembly 10 includes a housing 100 formed by joining a first shell 12 with a second shell 14 through a series of locking projections 16 (only one of which is shown). The first shell 12 has a end wall 20 with an axial opening 22 therein for receiving the proportioning device 18 through which the brake assembly 10 is connected to first and second brake circuits for supplying individual front and rear wheel brakes with substantially equal fluid pressure to effect a brake application.

In more particular detail, the housing 101 is separated by a movable wall 30 which includes a diaphragm 36 having a first bead 40 which is retained against the peripherial surface 38 of the housing and a second bead 42 which is retained in a groove 44 on a hub member 46 to define first 32 and second 34 chambers. The first chamber 32 is permanently connected with a first source of fluid (vacuum) through a check valve 26 while the second chamber 34 is selective connected to the first chamber 32 through a bore 48 and passage 49 in hub member 46 as a function of control valve 50. The control valve 50 is located in a projection 45 which extends through an opening in housing 14 and an includes a plunger 52, a poppet assembly 54 and an input rod 56. The operation of the control valve 50 is identical to the control valve described in U.S. Pat. No. 4,953,446 and designed to function in a first mode wherein the second chamber 34 is connected with the first chamber 32 to allow free communication of the first source of fluid (vacuum) to the second chamber 34, as illustrated in FIG. 1, and in a second mode, after poppet face 55 engages seat 53 to terminate communication of the first source of fluid through passage 49, to connect the second chamber 34 with a second source of fluid (air in the surrounding environment) to create a pressure differential across the movable wall 30. This pressure differential acts on the movable wall 30 to develop an actuation force for pressurizing fluid to effect a brake application.

The pressurized fluid which is supplied to the first and second brake circuits is achieved within the brake assembly 10 through the relationship of proportioning device 18, a first cylindrical means 60 connected with the proportioning device 18, a reaction member 122 through which an actuation force is transmitted to the first cylindrical means 60 and a resilient means 80 for positioning the movable wall 30 within the housing of the brake assembly 10.

The proportioning device 18, as shown in more detail in FIGS. 2,3 and 4, has a housing 90 which is secured to end wall 20 of shell 12. Housing 90 has an annular projection 17 which extends into the first chamber 32 and an inlet passage 92 for connecting a first face 94 with a reservoir 96, a first passage 98 connected to a first circuit of the brake system and a second passage 100 connected with a second circuit of the brake system. The cylindrical projection 17 which extends into the first chamber 32 has a peripherial surface 23 with a groove 83 thereon for receiving a flange 81 on shell 12 to seal the first chamber 32 from the surrounding environment. Housing 90 has bores 104 and 204 which are connected with the first passage 98 and the second passage 100.

A piston 110 is located in bore 104 between a first seat 112 adjacent an outlet port 116 connected to the first circuit of the brake system and a second seat 114 adjacent an outlet port 118 connected to the second circuit of the brake system. Piston 110 has a cylindrical body with a first end 120 and a second end 122 with a first groove 124 adjacent the first end 120, a second groove 126 adjacent the second end 122, and a third groove 128 located mid-way between the first 124 and second 126 grooves. The first 124 and second 126 grooves are permanently connected to reservoir 96 through ports 125 and 127, respectively. Groove 128 in piston 110 receives a contact 113 for sensor 115. Fluid is supplied to bore 104 through passages 98 and 100 and as long as the fluid pressure is substantially equal, piston 110 is centered as illustrated in FIG. 3.

A piston 210 is located in a bore 204 of housing 90. Bore 204 is connected to passage 100 and outlet port 116 by passage 202 and to passage 98 and outlet 118 by a passage 206. Piston 210 has a first cylindrical body with a first end 212 having a first diameter 214 which is separated by a shoulder 218 from a second end 216 having a second diameter 220. A sleeve 222 which is located on the second diameter 218 has a flange 223 and with disc 226 retained on the cylindrical body by a snap ring 228 cages spring 224. An end cap 230 secured to housing 90 has a face 232 which engages disc 226 to position flange 223 against shoulder 218 to center piston 210 within bore 204. Piston 210 which is located in bore 204 has a first effective area corresponding to the first diameter 214 and a second effective area corresponding to the second diameter 218. When the fluid pressure presented to a brake circuit through outlet port 116 and when the fluid pressure presented to a brake circuit through outlet port 118 are equal, piston 210 remains centered as shown in FIG. 4.

Mode of Operation of the Invention

In the brake assembly 10 when a vehicle is operating, vacuum produced at the intake manifold is communicated through conduit 11 to check valve 26. With vacuum present at check valve 26, air is evacuated from chamber 32 and with control valve 50 positioned as shown in FIG. 1, air is also evacuated from chamber 34 to equalize the fluid pressure in chamber 34 with the fluid pressure in chamber 32. Fluid communication between chamber 32 and chamber 34 is a function of the position of poppet assembly 54 and vacuum seat 53 on projection 45 of hub member 46 and atmospheric seat on the rear of plunger 52 as established by the input rod 56 of control valve 50.

Control valve 50, which operates in a manner as described in U.S. Pat. No. 4,953,466, has an equalization mode of operation where face 55 of poppet valve 54 is off of vacuum seat 53 and air is evacuated from chamber 34 by flowing through opening or passage 63 in hub member 46 to bore 48 and from bore 48 around the end of plunger 52 and vacuum seat 53 to passage 49 which is connected to chamber 32. The flow of air along this flow path continues until such time as the fluid pressure in chamber 34 is identical with the fluid pressure in chamber 32. Thereafter, the combined forces of return spring 57 acting on push rod 56 and valve spring 59 acting on poppet assembly 54 position poppet assembly 54 on vacuum seat 55 on projection 45 of hub 46 and atmospheric seat on the rear of plunger 52 to define a ready position or rest mode of operation for the brake assembly 10.

In a rest mode of operation, fluid from reservoir 96 is freely communicated to compensation chamber 128 for presentation to the first and second pressurizing chambers 84 and 86 in the first cylindrical means 60 and to the first and second branches of the brake system through proportioning device 18.

When an operator desires to effect a brake application, an input force is applied to push rod 56 to provide linear movement for plunger 52. Initial movement of plunger 52 allows poppet spring 59 to urge the face 55 on the poppet member 54 into sealing contact with vacuum seat 53, and thereafter permit atmospheric seat on the plunger 52 to move away from the poppet member 54 to allow air to flow into chamber 34 by way of retention key slot or passage 63 in hub member 46. With air present in chamber 34 and vacuum present in chamber 32 a pressure differential develops across movable wall 30. This pressure differential creates an actuation force which moves the movable wall 30 toward end wall 20 of shell 12. Initial movement of wall 30 is immediately transmitted through reaction member 122 into the first cylindrical means 60. The first cylindrical means 60, resilient means 80 and second cylindrical means 120 initially move as a unit to bring seals 125 and 127 on the face of the first end 124 of cylindrical means 120 into engagement with face 94 on projection 17 of housing 90 to seal the compensation chamber 85 from the flow path established between chamber 84 and the first branch by way of passage 98 and chamber 86 by the flow path established by passage 100. It should be understood that communication of compensation fluid from reservoir 96 is simultaneously terminated for both chambers 84 and 86 and as a result pressurization of fluid therein can simultaneously begin immediately. Such pressurization begins once the second cylindrical means 120 is seated and the actuation force overcomes spring 80 to move the first cylindrical means 60 which now slides in bore 70 of cylindrical means 121 extending from cylindrical projection 17 to pressurize fluid in chambers 84 and 86. The pressurized fluid is communicated along the first and second flow paths to bore 104 in proportioning device 18 for distribution through ports 116 and 118 to the first and second circuits of the brake system.

Piston 110 in bore 104 is responsive to the pressurized fluid respectively presented through passages 98 and 100 to outlet ports 116 and 118. Piston 110 remains centered such that identical pressurized fluid is presented to the first and second circuits of the brake system. At the same time, piston 210 in bore 204 also receives the same fluid pressure as presented to outlet ports 116 and 118. Should a small predetermined pressure differential occur between the fluid pressure as present in passage 98 or passage 100, piston 210 is responsive to the higher fluid pressure of the first and second fluid pressures and moves in bore 204 to providing additional fluid pressure to the lower fluid pressure of the first and second fluid pressures to substantially equalize the first and second fluid pressures supplied to the first and second circuits in the brake system for effecting a brake application. If the difference in fluid pressure occur that is greater than the predetermined difference, piston 110 moves toward an appropriate seat 112 or 114 to restrict the flow through the corresponding outlet port 116 or 118 and interrupt communication to the first or second circuit correspondingly connected to the lower fluid pressure Once piston 110 engages seat 112 or 114, groove 124 or 126 establishes a flow path for the circuit with reservoir 96 for the lower fluid pressure to assure that fluid in the system is not lost through the brake circuit having a lower fluid pressure level. On initial movement of piston 110, probe 113 of sensor 115 is moved out of groove 128 and a signal is derived from such probe movement to inform an operator of a low pressure condition in one of the first or second brake circuits.

The resistance to movement of the first cylindrical means 60 during pressurization of fluid in chambers 84 and 86 creates a reaction force which acts on end 76 such that first cylindrical member 60 moves toward the hub member 46 causing the reaction member 122 to act on the end of plunger 52 and provide an operator with an indication of the intensity or level of the pressurized fluid being supplied to effect a brake application.

On termination of the input force to push rod 56, return spring 80 acts on end 76 of the first cylindrical member 60 and provide a force by way of the reaction member 122 and hub member 46 to move the movable wall 30 toward shell 14. At the same time, push rod return spring 57 acts on and brings the atmospheric seat on plunger 52 into engagement with poppet member 54 such that poppet member 54 is off of vacuum seat 53 and air present in chamber 34 is evacuated to chamber 32 by way of passage 49. As movable wall 30 approaches a rest position, wave spring 129 moves end 124 on the second cylindrical means 120 away from face 94 on projection 17 of housing 90 such that seals 125 and 127 are no longer engaged with face 94. Thereafter, fluid in compensation chamber 85 is again communicated with chambers 84 and 86 by way of passages 130 and 132 to provide for replenishment of any fluid which may be lost from the brake system and maintain the fluid level in chambers 84 and 86 The brake assembly 10 as illustrated in FIG. 1 is again in a ready mode of operation.

I claim:

1. In a brake system having a proportioning valve with a housing having a first passage for receiving a first fluid pressure and a second passage for receiving a second fluid pressure, said first and second fluid pressures being supplied to first and second brakes to effect a brake application, the improvement comprising:

a first piston located in a first bore of said housing, said first bore having a first passage connected to said first brake and a second passage connected to said second brake, said first piston being responsive to a higher fluid pressure of said first and second fluid pressures by moving in said first bore to providing additional fluid pressure to a lower fluid pressure of said first and second fluid pressures to substantially equalize said first and second fluid pressures supplied to said first and second brakes for effecting said brake application; and a second piston located in a second bore of said housing, said second piston being responsive to a pressure differential between said first and second fluid pressures for interrupting communication to said first and second brakes correspondingly connected to said lower fluid pressure while opening communication with a reservoir for said lower fluid pressure.

2. The brake system as recited in claim 1 wherein said first piston includes:

a first cylindrical member having a first end with a first diameter separated from a second end with a second diameter by a shoulder;

sleeve means located on said second diameter; and resilient means located in said first bore and acting on said sleeve means to center said cylindrical means within said first bore.

3. The brake system as recited in claim 2 wherein said second piston includes:

a second cylindrical member having a first end and a second end with a first groove adjacent said first end, a second groove adjacent said second end, and a third groove mid-way between said first and second grooves, said first and second grooves being permanently connected to said reservoir such that movement of said second cylindrical member by a pressure differential connects one said first and second grooves with one of said first and second passages to define a flow path for said lower fluid pressure to prevent loss of fluid in said brake system.

4. The brake system as recited in claim 3 wherein first and second ends of said second cylindrical member on being moved by a pressure differential correspondingly engage first and second seats in said housing to seal said second bore from one of said first and second brakes receiving said lower fluid pressure.

5. The brake system as recited in claim 4 further including:

sensor means located in said housing for informing an operator of movement of said second piston.

6. The brake system as recited in claim 5 wherein said sensor means includes:

a probe which is located in said third groove, said probe being activated by moving out of said third groove on movement of said second piston by said pressure differential to supply signal of movement to inform an operator of a low pressure condition in one of said first and second brakes.

7. The brake system as recited in claim 2 further including:

an end member connected to said second end for caging said resilient member between said end member and said sleeve such that when said first and second fluid pressures are equal, first piston remains stationary within said first bore.

8. The brake system as recited in claim 1 wherein said first and second bores receive said first and second fluid pressure and should a pressure differential occur between either of said first and second fluid pressures said additional fluid pressure is only communicated to the lower of said first and second fluid pressures.

\* \* \* \* \*